UNITED STATES PATENT OFFICE.

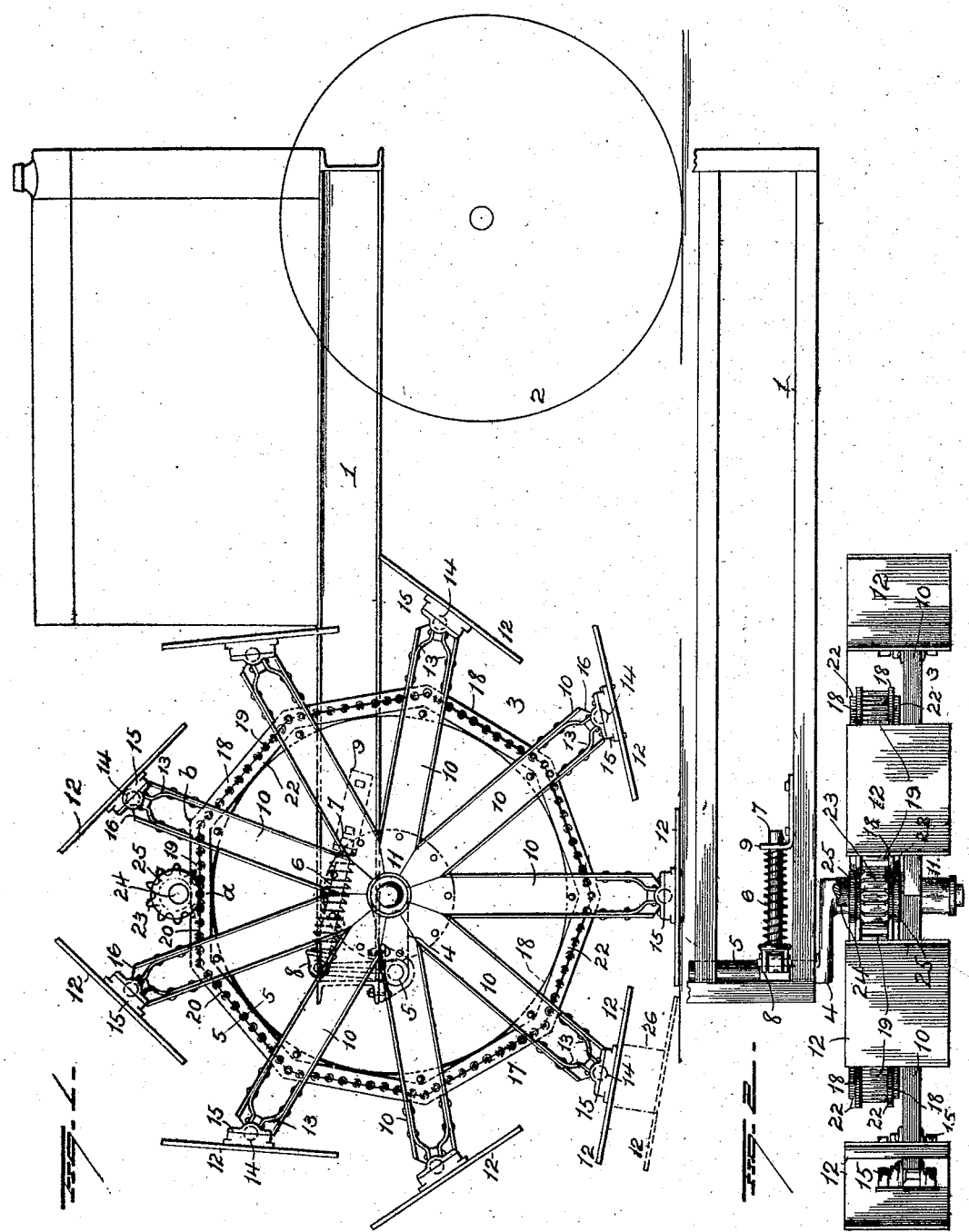

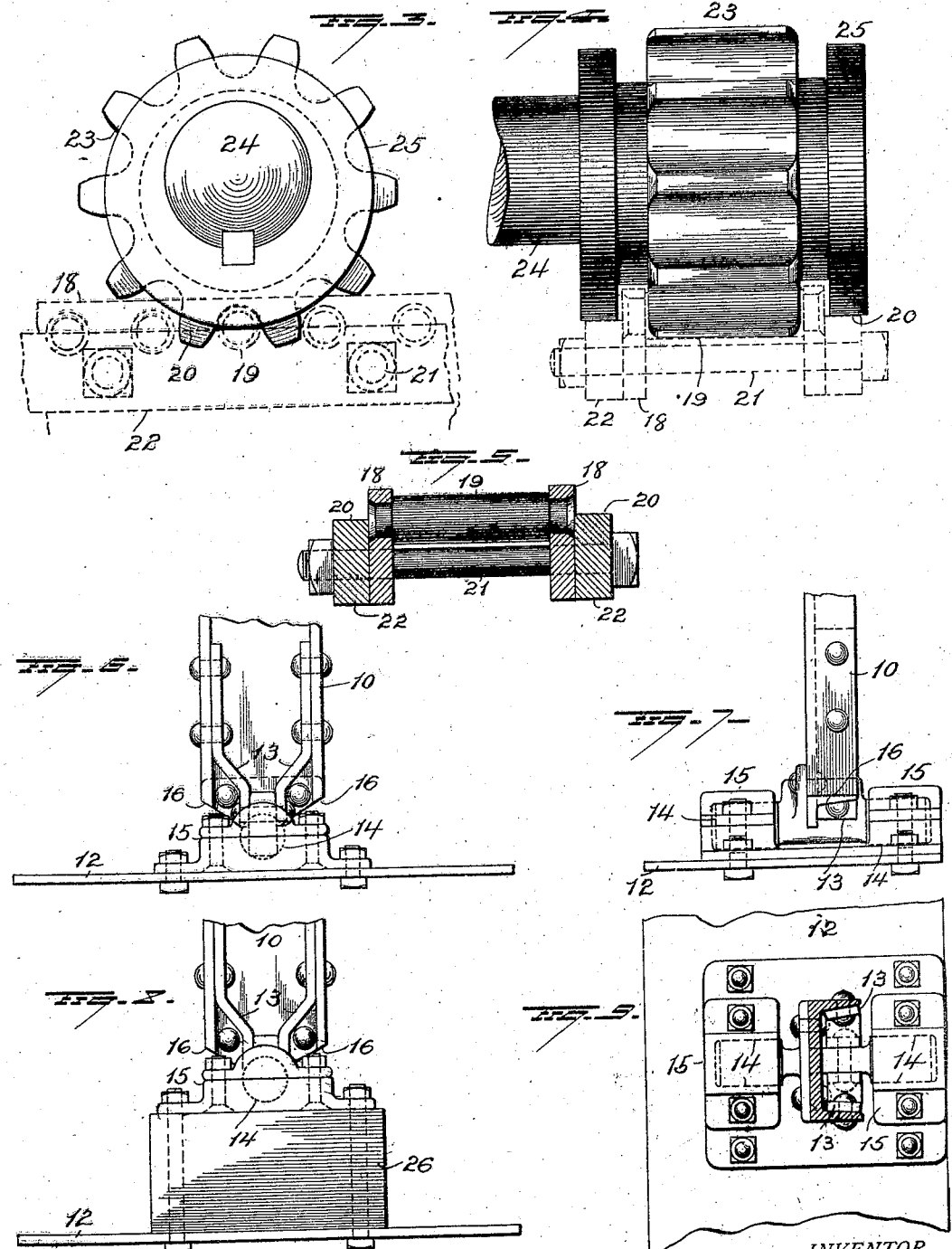

HERMAN E. ALTGELT, OF NEW BRAUNFELS, TEXAS.

TRACTOR.

1,263,726.

Specification of Letters Patent.  Patented Apr. 23, 1918.

Application filed May 8, 1917. Serial No. 167,299.

*To all whom it may concern:*

Be it known that I, HERMAN E. ALTGELT, a citizen of the United States, and a resident of New Braunfels, in the county of Comal and State of Texas, have invented certain new and useful Improvements in Tractors; and I do hereby declare the following to be a full, clear, and exact description of the invention, such as will enable others skilled in the art to which it appertains to make and use the same.

This invention relates to improvements in tractors and more particularly to that type disclosed in Letters-Patent to me on the 12th day of December 1916 and designated by No. 1,207,695, and which is adaptable for use as the draft means for plows and other agricultural implements.

One object of my present invention is to so improve tractors of the type specified that a constantly even and steady travel of the tractor shall be insured, and at the same time be so driven and operated as to compensate for vertical movements of the ambulatory wheels, whereby the uniformity of the position of the body relatively to the ground may be maintained.

A further object is to so construct the ambulatory wheels of a tractor that one of said wheels may run in a furrow and yet permit the body of the tractor to be maintained in a level position.

With these and other objects in view, the invention consists in certain novel features of construction and combinations of parts as hereinafter set forth and pointed out in the claims.

In the accompanying drawings; Figure 1 is a side elevation of a portion of a tractor showing the application of my improvements; Fig. 2 is a partial plan view; Figs. 3 and 4 are enlarged detail views showing the driving pinion; Fig. 5 is an enlarged sectional view on the line 5—5 of Fig. 1; and Figs. 6, 7, 8 and 9 are enlarged detail views illustrating the foot construction for the legs of the ambulatory wheels.

1 represents the frame or body of a tractor, the front wheels of which are represented diagrammatically at 2. The rear or driving wheels 3 are of the ambulatory type, and each is mounted on a crank axle 4 in such manner that it may have a vertical movement independently of the body of the tractor, and compensating means are provided (as hereinafter explained in detail) whereby the body of the tractor may be maintained in a substantially uniform horizontal position, notwithstanding the vertical movements of the ambulatory wheels during the travel of the machine. If a separate crank axle 4 be provided for each ambulatory wheel, each of such crank axles will be provided with an arm 5, between which, and the frame of the tractor a compensating spring 6 is disposed. This spring encircles a rod 7 having a bifurcated head 8 pivoted to the arm 5 on the crank axle and passing through a guide bracket 9 secured to the frame of the tractor,—one end of the spring bearing against said guide bracket and the other end bearing against the head 8 on the rod. The spring 6 serves to counterbalance of weight of the ambulatory wheel and the construction is such that said spring will be compressed when the center of the ambulatory wheel moves downwardly toward the ground, the greatest degree of compression taking place when the axis of the wheel reaches its lowermost position.

Each ambulatory wheel comprises a circular series of legs 10 radiating from a central or hub member 11, to which said legs may be secured substantially as shown in my previous Patent No. 1,207,695. Each leg 10 may consist of a channel bar, to the outer end of which a flat foot 12 is hinged. One member 13 of the hinge is secured to the outer end of the leg and provided with a pintle 14 mounted in brackets 15 secured to the foot 12,—said brackets constituting the other member of the hinge. The outer end of the leg may be beveled, as at 16, to form stops to prevent the foot from turning on the hinge farther than may be desirable. By hinging the feet 12 to the legs of the ambulatory wheel, flat surfaces are provided which press downwardly upon the ground without rotary contact therewith, and thus slipping or penetration into soft ground will be avoided.

Each ambulatory wheel is provided with a cam gear 17 comprising an annular series of straight sections which extend from leg to leg as clearly shown in Fig. 1.

The cam gear comprises two sets of parallel rails 18 each having straight portions between spokes and spaced apart by pins 19 riveted at their ends to the respective parallel rails 18, said pins forming the teeth or cogs of said cam gear. The pins or teeth 19 are so disposed that the outer edges of the rails will project somewhat beyond the same. The rails 18 are secured by means of bolts 21 to frame rings 22 and the latter are bolted to the ambulatory wheel, and form trackways 20 as hereinafter explained.

A pinion 23 is eccentrically secured to a driving shaft 24, suitably mounted on the body of the tractor and motion may be imparted to this in any improved manner (not shown) from the motor of the tractor. The teeth of the eccentrically mounted driving pinion mesh with the cam gear on the ambulatory wheel and it is provided at respective sides with rollers 25 which run on the track ways 20 so as to prevent the weight of the machine from coming upon the teeth or cogs of the gearing between the tractor body and the ambulatory wheels.

By constructing the ambulatory wheels and cam gearing as hereinbefore described and associating said cam gear with the pinion 23, on the tractor body, the vertical movement incident to the use of ambulatory wheels will not be transmitted to the body of the machine and hence the latter will always maintain a proper horizontal position. It will also be observed that the means which accomplish this result are also utilized as essential elements of the propelling or driving mechanism of the tractor.

In order to cause the tractor to travel at an even, constant speed and at the same time maintain the body at an even distance from the ground, it is important that the ambulatory wheel be driven with an eccentrically mounted pinion having the same number of cogs as one section of the cam forming the gear on the ambulatory wheel. The reason for mounting the driving pinion eccentrically is that the distance from the center of the ambulatory wheel to the point a of the cam gear or track is shorter than the distance from the center of the ambulatory wheel to the point b, and if the driving shaft were in the center of the driving pinion, the ambulatory wheel would travel too fast when the driving pinion reaches the point a and too slowly when the point b is reached. When the eccentric driving pinion engages the cam gear or track at the point a, one of the spokes or legs of the ambulatory wheel will be in a perpendicular position, at right angles to the ground, in which proximity it would propel the machine the fastest if the ambulatory wheel were driven at a constant speed. The eccentric driving pinion and the cam gear or track on the ambulatory wheel are so formed that the ambulatory wheel will rotate at a lesser speed when the lowest spoke or leg is in the proximity to a perpendicular position than when two of the spokes or legs are on the ground, in order to cause the tractor to travel at a constant and unvarying speed.

When the tractor is employed as draft means for a plow, it is frequently desirable to permit one of the wheels to travel in the furrow in order to avoid side draft on the tractor. However, when a tractor wheel is run in the furrow, the tractor will be out of level and incline toward the furrow side. In order that the tractor body shall be kept level, with one of the wheels in the furrow, I propose to increase the diameter of the ambulatory wheel at the furrow side of the tractor, over the diameter of the wheel on the land side of the tractor, sufficiently to compensate for the difference between the planes on which the ambulatory wheels at respective sides of the tractor travel. This may be accomplished by inserting a block or stilt 26 between each foot 12 and the hinge devices which connect the same with the legs 10, thus increasing the diameter of the ambulatory wheel.

Various changes might be made in the details of construction of my invention without departing from the spirit thereof or limiting its scope and hence I do not wish to restrict myself to the precise details herein set forth.

Having fully described my invention what I claim as new and desire to secure by Letters-Patent, is:—

1. The combination with the body of a tractor, and an ambulatory wheel mounted to have revoluble and also up-and-down movement relatively to the body, of a cam gear on said ambulatory wheel, and an eccentrically mounted driving gear on the body meshing with the cam gear on the ambulatory wheel.

2. The combination with the body of a tractor, and ambulatory wheels mounted to have revoluble and also up-and-down movement relatively to the body, of a cam gear on each ambulatory wheel, and an eccentrically mounted driving gear on the body meshing with the cam gear on the ambulatory wheel.

3. The combination with the body of a tractor, and an ambulatory wheel mounted to have revoluble and also up-and-down movement relatively to the body, of a cam gear secured to the wheel and comprising an annular series of sections extending from leg to leg of the wheel, and an eccentrically mounted driving gear on the body and meshing with said cam gear, the teeth of the driving gear corresponding in number to the number of teeth of one section of said cam gear.

4. The combination with the body of a tractor, and an ambulatory wheel mounted to rotate and to have up-and-down movement, of a cam gear secured to said ambulatory wheel, said cam gear provided with trackways adjacent to its teeth, a driving gear mounted on the tractor body, and rollers at respective sides of said driving gear and adapted to run on said trackways and relieve the teeth of the cam gear from the weight of the parts on which the driving gear is mounted.

5. The combination with the body of a tractor, ambulatory wheels, and means for driving said wheels, of means intermediate of the tractor body and said ambulatory wheels for counterbalancing the weight of the latter.

6. The combination with the body of a tractor, of an ambulatory wheel, a crank axle connecting said ambulatory wheel with the tractor body, an arm on said crank axle, a rod pivoted to said arm, a bracket secured to the tractor body and through which said rod is movable, and a spring encircling said rod and bearing at one end against said bracket and having a bearing at its other end against a part rigid with said rod.

7. The combination with the body of a tractor, of wheels at respective sides thereof, the wheel at one side of said tractor body comprising a plurality of radiating legs, feet for said legs, and blocks interposed between the outer ends of the legs and said feet, whereby the ambulatory wheel thus formed shall have greater diameter than the diameter of the wheel at the other side of the tractor.

8. The combination with the body of a tractor, of an ambulatory wheel therefor, said wheel comprising a plurality of radiating legs, and a flat foot hinged to each leg, a cam gear secured to said wheel, and an eccentrically mounted driving gear mounted on the tractor body and meshing with the cam gear on the ambulatory wheel.

In testimony whereof, I have signed this specification in the presence of two subscribing witnesses.

HERMAN E. ALTGELT.

Witnesses:
EMIL FISCHER,
BRUNO WENZEL.